United States Patent [19]

Stearns et al.

[11] 4,003,836

[45] Jan. 18, 1977

[54] DEVICE FOR FILTERING A MOVING FLUID

[75] Inventors: Charles F. Stearns, East Longmeadow, Mass.; Kenneth P. Hansen, Enfield, Conn.

[73] Assignee: United Technologies Corporation, Hartford, Conn.

[22] Filed: Apr. 15, 1976

[21] Appl. No.: 677,334

Related U.S. Application Data

[63] Continuation of Ser. No. 518,593, Oct. 25, 1974, abandoned.

[52] U.S. Cl. .............................. 210/247; 210/316; 210/339; 210/452; 210/456
[51] Int. Cl.² .................................... B01D 35/02
[58] Field of Search .......... 210/247, 316, 339, 452, 210/456; 55/463

[56] References Cited

UNITED STATES PATENTS

| 890,537 | 6/1908 | Stanley | 55/463 X |
|---|---|---|---|
| 3,109,809 | 11/1963 | Verrando | 210/338 X |
| 3,120,490 | 2/1964 | Samson | 210/132 |
| 3,355,021 | 11/1967 | Jones | 210/456 X |
| 3,724,669 | 4/1973 | Thal | 210/452 X |
| 3,856,683 | 12/1974 | Parr | 210/336 |

*Primary Examiner*—Frank A. Spear, Jr.
*Attorney, Agent, or Firm*—John D. Del Ponti

[57] ABSTRACT

A wash filter for tapping and filtering a portion of fluid in a moving stream has a plug mounted coaxially in a conduit receiving the stream. The plug includes a bullet-shaped nose similar to that in a conventional wash filter for accelerating the fluid through an annular passageway adjacent the conduit wall, and a porous frusto-conical screen or mesh body portion downstream of the nose and through which a portion of the accelerated fluid is tapped and filtered. Suspended particles in the fluid are driven toward the conduit wall by the plug nose while an inwardly located portion of the accelerated fluid passes inwardly through the porous screen and then through a base of the plug into a separate outlet line arranged coaxially of the conduit.

2 Claims, 2 Drawing Figures

FIG_1
PRIOR ART
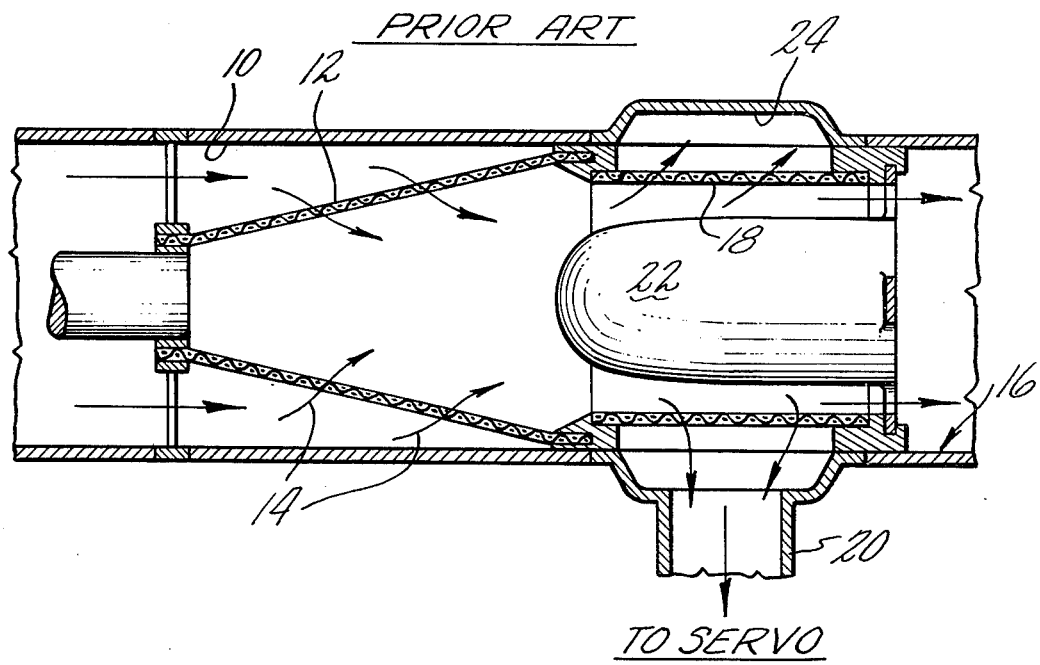
FIG_2
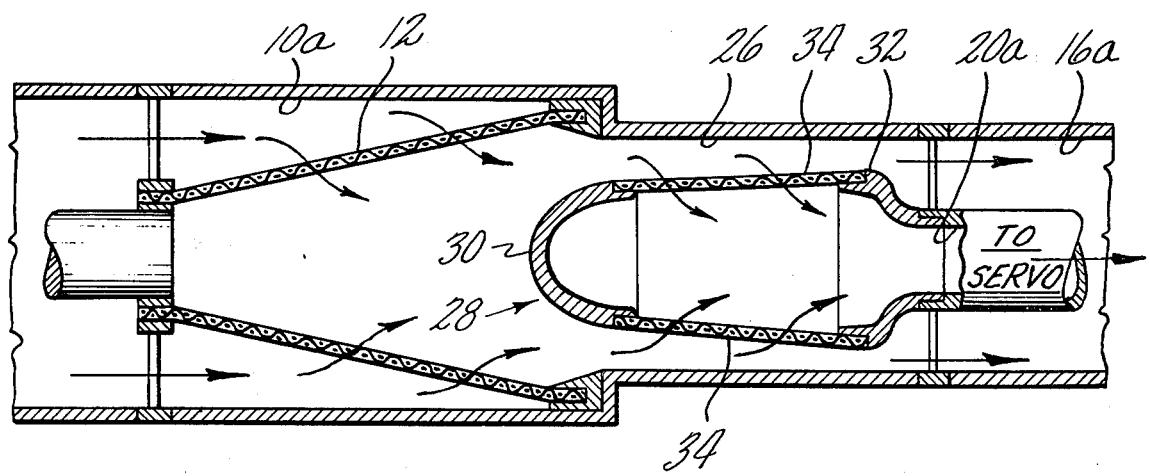

DEVICE FOR FILTERING A MOVING FLUID

This is a continuation of application Ser. No. 518,593, filed Oct. 25, 1974, now abandoned.

BACKGROUND OF THE INVENTION

This invention relates generally to fluid filtering devices and deals more particularly with a wash filter for bleeding a portion of the fluid flowing in a passageway through a filter plug mounted coaxially therein.

Wash filters of the prior art have had a wall-mounted screen or filter element over which a moving stream of fluid passes in a continuous washing or cleaning action and through which a portion of the moving stream is tapped and filtered. The use of fluid accelerating plugs in such filters is well known. Such plugs are impervious, bullet shaped deflectors, or abutments so arranged adjacent the screen to increase the flow velocity and washing action. The theory of operation for such wash filters is that at high velocity only the fluid itself is able to make the relatively sharp turn, or turns, required for entry into the wall-mounted screen, and foreign particles entrained in the fluid are carried downstream of the screen by reason of their greater momentum. Difficulties have been encountered, however, because the plug deflects entrained particles into the filter screen and the deflected fluid flow tends to drive the particles further into the screen. The washing action is correspondingly depreciated together with the filtering action.

It is, accordingly, a general object of the present invention to disclose an improved wash filter overcoming the above described deficiency of the prior art.

SUMMARY OF THE INVENTION

The present invention resides in a wash filter in which a filter plug is mounted in a conduit passageway so that the fluid stream is accelerated to high velocities over a wash filter screen in the plug. The general theory of operation is the same as in the prior art wash filters. However, as the plug increases the fluid velocity, particles of dirt or other material tend to be pushed to the outer conduit wall. Because the filter screen is positioned on the plug, instead of on the outer wall as in the prior art, there are less particles in the proximity of the screen; therefore, fewer particles will be carried through the screen with the fluid being filtered.

In carrying out the present invention the filter plug in a preferred embodiment is centrally mounted in the conduit and its nose is preferably of smaller diameter than its opposite end or base. The result is that the main passageway for the primary or unfiltered fluid flow is generally annular in configuration and is also convergent in the axial direction, at least along the axial dimension of the plug, to maintain the accelerated flow over the screen as some fluid is tapped off. The fluid so tapped and filtered passes out through the base of the plug into an outlet line which may be arranged coaxially of the conduit passageway.

The general aim of the present invention is to provide an improved fluid filtering device such that a portion of a fluid stream is tapped or bled through a porous plug arranged in a conduit passageway. The shape of the plug is such that only a selected cleaner portion of the fluid in the conduit is actually diverted through the filter screen in the plug, and the rest of the fluid is allowed to continue downstream of the plug.

BRIEF DESCRIPTION OF THE DRAWINGS

FIG. 1 is a sectional view through a prior art wash filter provided in conjunction with a conventional coarse filter upstream of the bullet shaped deflector or plug.

FIG. 2 is a sectional view through an improved filter constructed in accordance with the present invention.

DETAILED DESCRIPTION

FIG. 1 shows a fluid filtering device of the prior art which is commonly used in the fuel line of a gas turbine engine for tapping a portion of the fuel flow to operate the fuel control system for the engine. Fuel in the form of a fluid is pumped from a source or tank, and passes through a generally cylindrical line or conduit 10 and a coarse screen or filter 12 as indicated generally by the arrows 14, 14. A major portion of the fluid flow in the conduit 10 may continue on to the engine as for example through outlet 16 after the fluid has been filtered to some extent by the relatively coarse filter 12. A fine wire mesh screen filter 18 also of generally cylindrical configuration and functioning as a wash filter is provided in the wall of the conduit 10 to finely filter a portion of the fluid and direct the finely filtered fluid through an outlet 20 connected to the servomechanism of the fuel control system. Although such a filter is used in fuel control systems, any servo-system which requires very clean fluid for its proper operation might be provided with a filter of this general type.

The wash filter defined in part by the screen 18 includes a bullet shaped plug 22 on the axis of the conduit 10, and the plug serves to decrease the cross sectional flow area and correspondingly increase the velocity of the fluid, some of which fluid continues past the bullet shape downstream to the outlet 16, and at least a portion of which fluid passes through the fine mesh wire screen 18 into the annular chamber 24 which communicates with the outlet 20 mentioned previously. The high fluid velocity is intended to make it difficult for the heavier foreign particles to move toward the screen 18 and also is intended to wash away any particles which do reach the screen. Thus, most foreign particles entrained in the fluid are supposed to continue downstream to the annular outlet between the plug 22 and the wall of the conduit 10. However, it has been observed that the bullet shaped nose of the plug 22 has the tendency to direct the foreign particles toward wall of the conduct and the screen as the fluid enters the region occupied by the plug. Thusly the plug 22 adversely affects the intended washing action by placing the foreign particles in a position most likely to clog the fine screen.

The present invention provides an "inside-out" wash filter which permits the plug 22 to not only provide a reduced cross sectional flow area and increase the velocity of the fluid flow, but also to filter the fluid. The plug is hollow, and itself has the fine wire mesh screen or filter through which the finely filtered flow passes on its way to a servo-system of the fuel control system.

Considering in greater detail the fluid filtering device of the present invention shown in FIG. 2, a fuel line or conduit 10a is adapted to deliver fuel under pressure to a gas turbine engine through the outlet 16a, and a coarse filter 12 described above in FIG. 1 is preferably provided in this line for removing larger particles of the type which would interfere with normal operation of the engine or its fuel injection system. In accordance with the present invention a portion of the fluid entering conduit 10a is bled from the fluid in the conduit 10a through a fine filter plug 28 into a smaller line 20a provided for delivering the finely filtered fluid to the fuel control system or other servo-system as required. Whereas the prior art wash filter design of FIG. 1 utilizes an annular chamber 24 and associated fine mesh screen 18, the new and improved wash filter shown in FIG. 2 utilizes a straight and impervious conduit wall defining the generally cylindrical passageway 26, and the filter plug 28 is mounted in the conduit. The plug 28 is mounted coaxially in the passageway 26 and has a fluid impervious nose portion 30 which is of blunt dome shape, and of smaller diameter than an annular base 32 used to connect the downstream end of the plug 28 to the conduit wall and the outlet line 20a. The nose portion of the plug can, if desired, also be attached to the conduit wall or other structure upstream of the plug.

Most significant for purposes of practicing the present invention, the plug 28 is hollow, and its tapered side wall or body portion is defined by a fine mesh stainless steel screen 34 which is preferably frusto-conical in shape having its smaller end connected to the nose portion 30 and its larger end received by the annular base 32. As so constructed and arranged the plug cooperates with the cylindrical passageway to define a convergent annular flow passageway for the major portion of the fluid ultimately discharged through the outlet 16a. The remaining portion of the fluid is bled through the fine screen 34 of the plug. This construction affords an improved filtering action because the foreign particles in the incoming fluid are driven outwardly toward the wall of conduit 10a and away from the screen 34. A separate annular chamber and the filter screen are not needed or installed in the conduit wall. The velocity of the fluid over the screen 34 is maintained by the tapered shape of the plug 28 as fluid is bled through the screen and, thusly, the washing action is maintained. In the improved wash filter the portion of the fluid producing the washing action and being finely filtered is cleaner because the foreign particles have been directed to positions away from the filter screen by the nose of the plug.

In summary, with a filter plug centrally mounted, the particles do not impinge directly on the screen 34 and hence the propensity for the wash filter to become less effective due to clogging or to be damaged by high velocity particles is lessened. These advantages are obtained without detriment to the basic operations of a conventional wash filter, namely the use of a high velocity fluid to separate fluid to be filtered from particles in the fluid and to wash the fine filter screen located in the region of such high velocity fluid flow.

We claim:

1. A device for filtering a portion of the fluid from a moving fluid stream comprising:
    a. conduit means having a wall defining a passageway with a fluid inlet for axially receiving the moving fluid stream, and a first outlet axially spaced downstream in the flow from said inlet;
    b. filter means in said passageway for filtering relatively coarse particles from said moving fluid stream; and
    c. a tapered plug mounted within the passageway downstream of said filter means in spaced relation to said wall to form an annular passageway between said plug and said wall which is convergent in the direction of flow of said stream and communicating with said first outlet, said plug having a fluid-impervious dome-shaped nose portion adjacent said inlet, the plug cooperating with the conduit means to accelerate the flow of fluid and to direct particles entrained in the fluid generally outwardly in said annular passageway toward the wall and said first outlet, said plug having a frusto-conically shaped hollow body portion the smaller end of which is attached to said nose portion, said body portion made from a fluid filtering material pervious to the flowing fluid adapted to bleed a portion of said flowing fluid therethrough to filter relatively fine particles therefrom, said plug including a fluid impervious base attached to the larger end of said hollow body portion and having an opening leading to a second outlet, said opening adapted to receive the fluid which is bled through said pervious body portion of said plug.

2. The device according to claim 1 wherein said plug body portion comprises a fine mesh stainless steel screen material.

* * * * *